May 22, 1928.
E. BELIN
TELEVISION
Filed Nov. 20, 1923
1,670,795
2 Sheets-Sheet 1
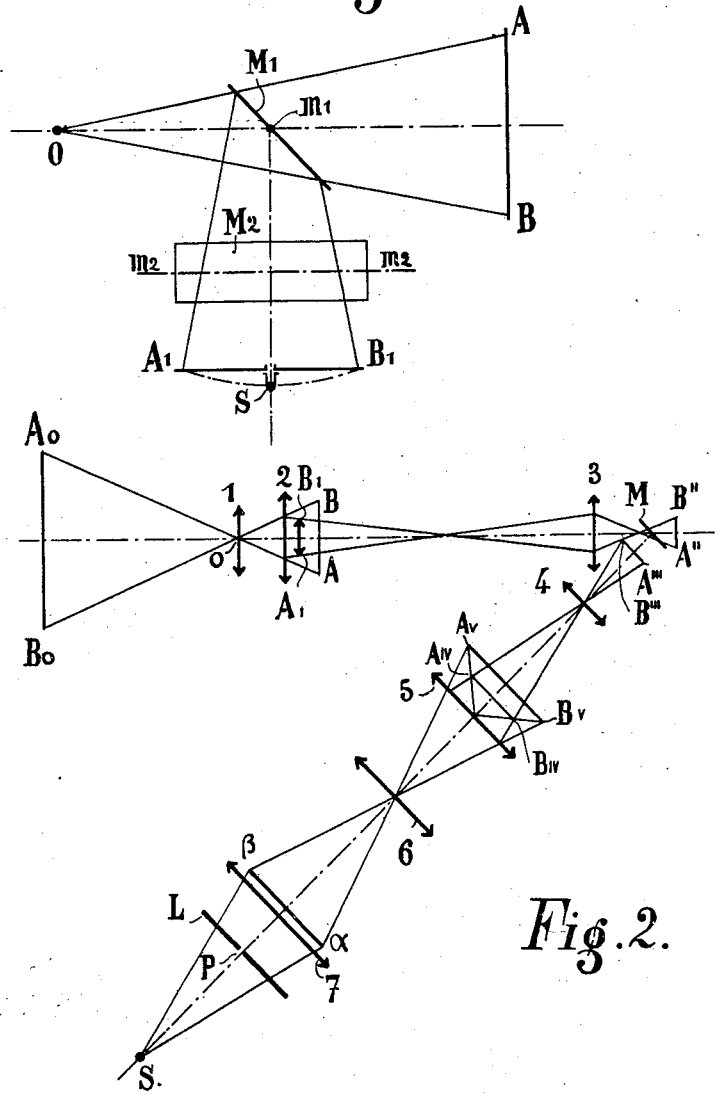
*Fig.1.*
*Fig.2.*
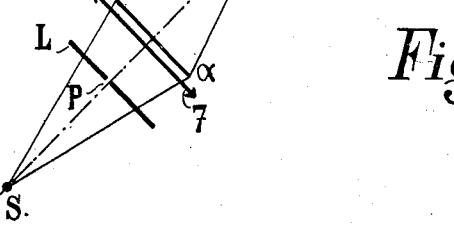
Inventor
E. Belin.

May 22, 1928.
E. BELIN
TELEVISION
Filed Nov. 20, 1923
1,670,795
2 Sheets-Sheet 2
Fig. 3.
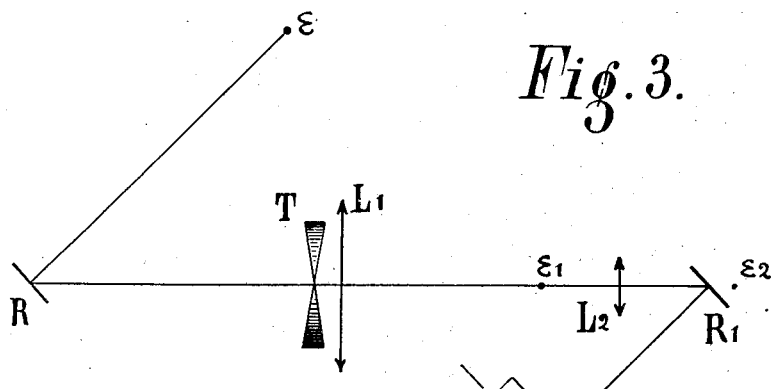
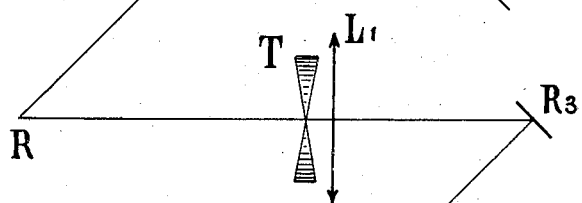
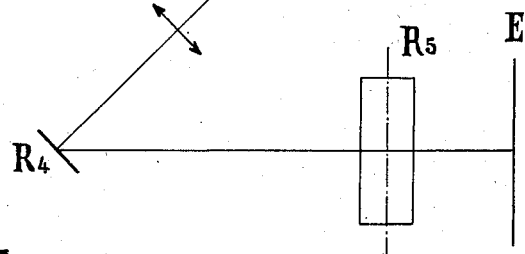
Fig. 4.
Inventor
E. Belin
By Robb Robb & Hill
Attorneys Patented May 22, 1928.

1,670,795

UNITED STATES PATENT OFFICE.

EDOUARD BELIN, OF RUEIL, FRANCE.

TELEVISION.

Application filed November 20, 1923, Serial No. 675,915, and in France December 27, 1922.

This invention relates to electrical picture transmission systems, and particularly to television, although the principles of the invention may be applied to the distance transmission of still pictures by line wire or radio.

The problem of television cannot be compared with that of projecting a large number of successive prints or the like as in a cinematograph; it requires the projection of such a number of selected luminous or illuminated points of the object to be reproduced that the whole of this object is explored in a time period such that portions of the object cannot become displaced or the object altered to any substantial extent; moreover projection should take place with an intensity and a rapidity such that the eye receives a sensation similar to that which it has when looking at the object itself and such that retinal persistance occurs in order that the sensation may be continuous.

As television requires exploration and a reconstitution in a very short time by a considerable number of points ordinary methods of transmission as employed in telephonic and telegraphic transmission over line wires and apparatus connected therewith are not capable of answering all requirements. Continuous waves such as are generated and employed in wireless telegraphy and telephony may, however, be efficiently employed for line wire or wireless transmission. In the use of a wire, it is employed as a director of waves, and such use should be considered as coming within the scope of the invention.

It is known that waves generated at a transmitting station may be modulated; in wireless telephony it is the variation of resistance of the microphone which causes such modulation.

For television forming the subject of this invention it has been found that an element whose resistance to the passages of the current varies according to the degrees of illumination of such element will produce a phenomenon which is very comparable and in some ways identical with sound modulation.

The solution of the problem of television so far as relates to transmission consists therefore in dividing up the object into a definite number of points and in causing the sensitive element to operate for all of such points. It is obvious that we have to consider not the object itself so much as its real optical image produced in a photographic camera. There are thus two methods of operation: exploring the optical image by the sensitive element or moving the optical image over the stationary element.

Without rejecting the first method it may be said that considerable difficulty is met with in carrying it out. This will be seen from some figures, which are however very approximative.

If the optical image similar to that in a cinematograph be taken, that is of a size $18 \times 24$ mm., it has a surface of 432 millimeter. For an exploration of 5 points to the sq. mm. (which is not excessive as in projecting there should be 25 points to the sq. mm.) there would be nearly 11000 for one image. In a cinematograph at least 10 pictures are projected per second; the number of points will thus lie between 100,000 and 120,000 per second.

It will be seen that in order to displace the sensitive member 100,000 times per second with a pause between the movements, inertia effects will be encountered which render exploration by the first method inexpedient at the present time.

In the second method, the sensitive element remains stationary and may be of very delicate construction. It may be for example a selenium cell or a photoelectric bulb or other known means. It is only necessary to insert in the circuit of this cell or lamp a positive or negative resistance proportional or substantially proportional (a simple function or even an exponential function) to the illumination of the sensitive point.

A real optical image of the object is moved over this point.

Fig. 1 is a diagrammatical representation of one form of transmitter; Fig. 2 is a modification; Fig. 3 shows a diagrammatical representation of one form of receiver; and Fig. 4 is a modification thereof.

Referring to Figure 1, it will be seen that if the optical axis of the sighting objective passes through O a real optical image of the objective will be formed at A—B. This image can be transferred to A' B' by reflecting the emergent rays by a mirror $M_1$.

By turning mirror $M_1$ around its axis $m_1$ at right angles to the plane of the figure, all the points on a line $A'$ $B'$ of the image can be brought to a point S lying behind a small hole $s$ in a diaphragm $S'$ placed at $A'$ $B'$: thus this point will be successively illuminated by points of the line A B. If however a second mirror $M_2$ is interposed in the path of the beam reflected by $M_1$ and is turned about the axis $m_2$ $m_2$ it may be in the plane of the figure and at right angles to $m_1$, then after the movement of a line over S mirror $M_2$ may be so displaced that an adjacent line passes over S during the return movement of mirror $M_1$. Thus wholly to explore the image $A'$ $B'$ mirror $M_1$ must (in the time taken for this exploration) make a number of movements equal to the number of lines into which the object has been divided up and mirror $M_2$ must at each oscillation be displaced through the angle required to bring successive lines on to point S.

In the case under consideration, mirror $M_2$ should have 90 angular displacements and mirror $M_1$ should make 45 to and fro movements in the time taken as the minimum. During this period the sensitive element will modulate a generator circuit of continuous waves; this is effected by any method best adapted to the particular circumstances. As indeed effects of a point like character only come into question each movement of mirror $M_1$ may be continuous; the modulating effect is therefore really worthy of this name, that is it causes a variation without points or jerks in the generator circuit.

This circuit will therefore emit modulated waves according to the luminous intensity of the image. It should be understood that by "the point S" is meant either the sensitive cell itself or an optical system allowing the luminous effect to act upon the cell with power and clearness i. e. the sensitive cell may be mounted in rear of an optical system similar to an enlarging objective which concentrates or spreads that portion of the incident beam which passes diaphragm $A'$ $B'$, that is corresponding to an image element. It should also be understood that the modulation caused by the sensitive cell is utilized directly or with the interposition of suitable amplifying systems.

The transmitting system just described may be modified by employing the mirror of an oscillograph instead of and in place of the mirrors $M_1$ $M_2$. This variation is illustrated diagrammatically in Figure 2.

Let it be supposed that objective O gives an image AB of the object $A_o$ $B_o$. By acting on this optical image before its formation with an optical system very similar to a reversed microscope, a reduced image $A'$ $B'$ will be produced, then another image $A''$ $B''$. By a proper selection of the powers of the lenses 1—2—3, the image may be given the dimensions of an oscillograph mirror.

If an oscillograph scanning mirror M is interposed in front of the plane of the image $A''$ $B''$, the image will be deviated and a microscope arrangement 4—5 identical with the first will give an image $A'''$ $B''' = A''$ $B''$ while an objective 6 will produce an image $\alpha$ $\beta$ of any size desired. If mirror M is vibrated by alternating current at a predetermined frequency, the image $A'''$ $B'''$ will be displaced in its plane.

If at $\alpha$ $\beta$ a converging objective 7 is provided, a sharp image of mirror M will be obtained at S. A sensitive cell is placed at this point. In order that the image may be methodically explored by the cell, the following arrangement of movable scanning diaphragm is provided. A diaphragm L having in it an aperture P has imparted to it a movement of translation parallel to the plane of oscillation of the image $\alpha$ $\beta$.

It will be seen that for the period of a half oscillation of such image, if such aperture is assumed, for purpose of illustration, to be substantially stationary there will be a free passage for all the elements of one line of $\alpha$ $\beta$ at right angles to the axis of oscillation of mirror M. If at the moment at which such line is passed through, i. e. at which the mirror returns, the aperture is displaced through the space between one line and the next there will be a free passage for the elements of another line of $\alpha$ $\beta$. The luminous points therefore of these two lines will both pass over cell S. The movement of the aperture in front of lens 7 continues for the whole duration of the vibrations of mirror M, until the entire image has been traversed and all the points successively pass over the cell S.

For the example in question the mirror M should receive 45 vibrations and the point P should make a complete traverse in 90 steps for one complete exploration. The variations produced on cell S are as in the former case not sudden, but on the contrary continuous while modulation also is absolute. Instead of using a diaphragm with a single aperture P, there may of course be a continuously moving (rotary) band (shutter disk) which turns behind S and has in it as many apertures P as are necessary for the passage of the luminous small areas or subdivisions of the beam with the required degree of rapidity. Under such conditions the image is explored by lines which are oblique to the direction of displacement of the aperture P and not at right angles, but the whole effect will be retained.

At the receiving station the waves of a predetermined frequency but modulated are received with or without amplifying means. It is therefore necessary on the one hand to produce a luminous beam whose intensity is proportional or proportioned to such modulation and on the other hand to displace such beam according to a law which is exactly similar to that of the exploration of the image for transmission.

The following arrangement may be employed which is in some ways the replica of the transmitter.

A luminous source $\Sigma$, Figure 3, produces a beam which is reflected by means of a mirror R forming part of an oscillograph through which the modulated current passes; the emergent beam will therefore be displaced in a plane; it is caused to fall upon a strip T having a symmetrically graduated transparency from absolute opacity to absolute transparency in such a manner that for a maximum deviation produced by the effects of modulation corresponding to the maximum illumination or no illumination of the transmitting cell S, the strip will be traversed from the centre to one end. A lens $L_1$ placed in the path of the beam thus varied in intensity produces at $\Sigma_1$ the image of R. A lens $L_2$ will bring such image to $\Sigma_2$ between $L_2$ and $\Sigma_2$ however a mirror $R_1$ is interposed which synchronizes with mirror $M_1$, Figure 1 of which it is the replica. The beam is again reflected at right angles by a mirror $R_2$ similar to mirror $M_2$ and synchronizing therewith. The screen E receives an image similar to A' B' in Figure 1. At $\Sigma_1$ there may be a mirror $R_3$ as in Figure 4. The beam reflected from $R_3$ is displaced acording to the displacements of R. If however mirror $R_3$ is given equal and opposite angular displacements to those of mirror R the reflected beam will be fixed.

The beam then falls on a lens $R^{3'}$ which concentrates it upon a mirror $R_4$ to which movements are imparted in synchronism with those of mirror $M_1$ (Figure 1). At E a stationary line is produced whose points will vary in intensity. As in Figure 1 a mirror $R_5$ having movements synchronizing with those of $M_2$ will impart to such line displacements in a direction at right angles to its length. It will therefore be seen that in both arrangements successive and upwardly moving lines appear on screen E. If projection is effected at a speed such that retinal persistance occurs and that visual acuteness is not exceeded a spectator will see the whole image on the screen E, while if the images succeeded one another sufficiently rapidly for the effect of persistence to be maintained, projection will be continuous and will effectively represent the objects at the transmitting station.

Synchronism of mirrors $M_1$ $M_2$ $R_1$ $R_2$ $R_4$ $R_5$ may be obtained by simple and sure means, for example by means of a wave superimposed on the modulated wave but of different length. The manner of mechanically connecting $M_1$ and $M_2$, $R_1$ and $R_2$ and $R_4$ and $R_5$ in order to maintain synchronism by a single synchronizing current is an obvious mechanical expedient and does not come within the scope of the invention.

In the same manner any arrangement may be adopted which allows the luminosity of projection to be increased.

It is easy to conceive a modification which can readily be carried into effect; thus modulation at the receiver may be employed to cause, by modifying a transverse field, the deviation of a cathode ray controlled in a Braun tube as has been done for making a cathode ray oscillograph.

The illumination of the screen may be varied by a suitable screen (of lead or other opaque material of a graduated thickness or opacity); the luminous effect on the screen may be caught either by a rotating mirror with an exploration system similar to that above described or even by a film which is exposed, developed and projected immediately, which will only cause the reproduction to lag behind the actual object for a relatively short time which time is always constant; the Kerr phenomenon or any other phenomenon which give rise to displacements of luminous beams by electromagnetic or static effects may be employed.

Having now particularly described and ascertained the nature of my said invention and in what manner the same is to be performed, I declare that what I claim is:

1. In a television system, means for producing, in a single plane, an original luminous image and a reduction thereof, a photosensitive element, an oscillograph mirror operative to scan the reduced image and to deflect the same angularly from its plane into a plane extending on a straight line between the oscillograph mirror and the photosensitive element, means in the latter-named plane for enlarging the deflected image, and a scanning device operative angularly of the plane of the enlarged portion of the deflected image for scanning the same and governing the passage of the luminous points thereof to the photosensitive element.

2. In a television system, an image, means for projecting said image to produce said image of smaller dimensions than said original image, scanning means for scaning said smaller image, means for projecting said image a second time to produce an image of larger dimensions and a second scanner for scanning said image of increased dimensions.

3. In a television system, a luminous image, a series of lenses, for decreasing the dimensions of said image, means for scanning said image of smaller dimensions, a second series of lenses for increasing the dimensions of said image and a second scanning element for scanning said image of increased dimensions.

4. In a television system, a fixed source of light, a deflecting member deflected in accordance with the variations of received currents for deflecting said beam of light, means positioned in the path of the beam of light for permitting variable amounts of said light to pass in accordance with the extent of deflection thereof, and a second deflecting member arranged to deflect for distances proportional to the deflection of said first deflecting member whereby the path of said beam of light remains the same irrespective of the deflection of said first deflecting member.

5. In a receiver, a beam of light, means for deflecting said beam from a predetermined path in accordance with received current and a second movable means operated in conjunction with said first means for deflecting said beam in opposite direction from said first deflection and scanning means for moving said beam over a surface.

EDOUARD BELIN.